United States Patent
Tsai et al.

(10) Patent No.: US 11,765,365 B2
(45) Date of Patent: Sep. 19, 2023

(54) METHOD AND APPARATUS OF SUBBLOCK DEBLOCKING IN VIDEO CODING

(71) Applicant: HFI Innovation Inc., Zhubei (TW)

(72) Inventors: Chia-Ming Tsai, Hsinchu (TW); Chih-Wei Hsu, Hsinchu (TW); Ching-Yeh Chen, Hsinchu (TW); Tzu-Der Chuang, Hsinchu (TW); Yu-Wen Huang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/717,578

(22) Filed: Apr. 11, 2022

(65) Prior Publication Data
US 2022/0239931 A1    Jul. 28, 2022

Related U.S. Application Data

(62) Division of application No. 17/270,610, filed as application No. PCT/CN2019/103708 on Aug. 30, 2019, now Pat. No. 11,330,277.

(Continued)

(51) Int. Cl.
*H04N 19/00* (2014.01)
*H04N 19/176* (2014.01)
(Continued)

(52) U.S. Cl.
CPC ......... *H04N 19/176* (2014.11); *H04N 19/117* (2014.11); *H04N 19/132* (2014.11);
(Continued)

(58) Field of Classification Search
CPC ...... H04N 19/513; H04N 11/04; H04N 19/82; H04N 19/117; H04N 19/132;
(Continued)

(56) References Cited

U.S. PATENT DOCUMENTS

| 11,240,495 B2 | 2/2022 | Jang et al. |
| 2006/0165181 A1* | 7/2006 | Kwan ........... H04N 19/176 |
| | | 375/E7.176 |

(Continued)

FOREIGN PATENT DOCUMENTS

| CN | 1870752 A | 11/2006 |
| CN | 101304526 A | 11/2008 |

(Continued)

OTHER PUBLICATIONS

International Search Report and Written Opinion dated Oct. 30, 2019, issued in application No. PCT/CN2019/103708.

(Continued)

*Primary Examiner* — Zhihan Zhou
(74) *Attorney, Agent, or Firm* — McClure, Qualey & Rodack, LLP

(57) ABSTRACT

Method and apparatus for constrained de-blocking filter are disclosed. One method receives input data related to a current block in a current picture at a video encoder side or a video bitstream determines a block boundary of the current block and sub-block boundaries inside the current block, wherein the current block is partitioned into a plurality of sub-blocks using sub-block mode prediction. The method then applies de-blocking process to a reconstructed current block corresponding to the current block to result in a current filtered-reconstructed block, wherein said applying the de-blocking process to the current block comprises applying the de-blocking process to the sub-block boundaries inside the current filtered-reconstructed block, and generates a filtered decoded picture including the current filtered-reconstructed block.

6 Claims, 12 Drawing Sheets

Related U.S. Application Data

(60) Provisional application No. 62/778,324, filed on Dec. 12, 2018, provisional application No. 62/747,173, filed on Oct. 18, 2018, provisional application No. 62/725,316, filed on Aug. 31, 2018.

(51) Int. Cl.
  *H04N 19/117* (2014.01)
  *H04N 19/132* (2014.01)
  *H04N 19/159* (2014.01)
  *H04N 19/184* (2014.01)
  *H04N 19/513* (2014.01)

(52) U.S. Cl.
  CPC ......... *H04N 19/159* (2014.11); *H04N 19/184* (2014.11); *H04N 19/513* (2014.11)

(58) Field of Classification Search
  CPC .... H04N 19/176; H04N 19/86; H04N 19/159; H04N 19/14; H04N 19/184
  See application file for complete search history.

(56) References Cited

U.S. PATENT DOCUMENTS

| | | |
|---|---|---|
| 2015/0016550 A1 | 1/2015 | Kim et al. |
| 2018/0109810 A1* | 4/2018 | Xu ................... H04N 19/176 |
| 2018/0184125 A1 | 6/2018 | Nandan et al. |
| 2018/0309988 A1* | 10/2018 | Alshina ............. H04N 19/119 |
| 2019/0200016 A1* | 6/2019 | Jang ................. H04N 19/176 |
| 2019/0208209 A1 | 7/2019 | Jang et al. |
| 2020/0120359 A1* | 4/2020 | Hanhart ............. H04N 19/174 |
| 2020/0322601 A1* | 10/2020 | Ko .................... H04N 19/593 |
| 2020/0322632 A1* | 10/2020 | Hanhart ............. H04N 19/86 |
| 2021/0014522 A1* | 1/2021 | Jung ................. H04N 19/132 |

FOREIGN PATENT DOCUMENTS

| | | |
|---|---|---|
| JP | 2012-151690 A | 8/2012 |
| WO | 2017/045580 A1 | 3/2017 |
| WO | 2018/038492 A1 | 3/2018 |
| WO | 2018/044142 A1 | 3/2018 |

OTHER PUBLICATIONS

Chinese language office action dated Nov. 9, 2020, issued in application No. TW 108131384.

Partial Supplementary European Search Report dated Jun. 1, 2022, issued in application No. EP 19853985.0.

Andersson, K., et al.; "CE2-2.1.1: Long deblocking filters and fixes;" Joint Video Experts Team (JVET) of ITU-T SG 16 WP 3 and ISO/IEC JTC 1/SC 29/WG 11; Jul. 2018; pp. 1-6.

Chinese language office action dated Jun. 24, 2022, issued in application No. CN 201980056693.7.

\* cited by examiner

METHOD AND APPARATUS OF SUBBLOCK DEBLOCKING IN VIDEO CODING

CROSS REFERENCE TO RELATED APPLICATIONS

The present invention is a Divisional of pending U.S. patent application Ser. No. 17/270,610, filed on Feb. 23, 2021, which is a 371 National Phase Patent Application of pending PCT Application Serial No. PCT/CN2019/103708, filed on Aug. 30, 2019, which claims priority to U.S. patent application Ser. No. 62/725,316, filed on Aug. 31, 2018, U.S. patent application Ser. No. 62/747,173, filed on Oct. 18, 2018 and U.S. patent application Ser. No. 62/778,324, filed on Dec. 12, 2018. The U.S. Patent Application is hereby incorporated by reference in its entirety.

FIELD OF THE INVENTION

The present invention relates to coding of video and image data. In particular, the present invention relates to techniques to improve video quality by using de-blocking filtering in video/image coding systems utilising sub-block processing.

DESCRIPTION OF THE RELATED ART

Video data requires a lot of storage space to store or a wide bandwidth to transmit. Along with the growing high resolution and higher frame rates, the storage or transmission bandwidth requirements would be formidable if the video data is stored or transmitted in an uncompressed form. Therefore, video data is often stored or transmitted in a compressed format using video coding techniques. The coding efficiency has been substantially improved using newer video compression formats such as H.264/AVC and the emerging HEVC (High Efficiency Video Coding) standard.

In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Furthermore, the basic unit for transform coding is square size named Transform Unit (TU).

In HEVC, de-blocking filter is applied after the picture is reconstructed. The boundaries between coding units, prediction units or transform units are filtered to alleviate the blocking artefacts caused by the block-based coding. The boundary can be a vertical or horizontal boundary. The boundary pixels involved in de-blocking filter for the vertical boundary (110) and horizontal boundary (120) as shown in FIG. 1A and FIG. 1B respectively. For a vertical boundary (i.e., line 110 in FIG. 1A), a horizontal filter is applied to some boundary samples in each horizontal line. For example, the horizontal de-blocking filter may be applied to p00, p01 and p02 on the left side of the vertical boundary and q00, q01 and q02 on the right side of the vertical boundary. Similarly, for a horizontal boundary (i.e., line 120 in FIG. 1B), a horizontal filter is applied to some boundary samples in each vertical line. For example, the vertical de-blocking filter may be applied to p00, p01 and p02 on the left side of the horizontal boundary and q00, q01 and q02 on the right side of the horizontal boundary. In other words, the de-blocking filter is applied in a direction perpendicular to the boundary. As shown in FIG. 1A and FIG. 1B, when doing vertical de-blocking filtering (i.e., filtering horizontal boundaries), the above block height (from TU or PU) of a horizontal boundary is referred as the side length of the P side and the below block height (from TU or PU) of the horizontal boundary is referred as the side length of the Q side. Similarly, when doing horizontal de-blocking filtering (i.e., filtering vertical boundaries), the left block width (from TU or PU) of a vertical boundary is referred as the side length of the P side and the right block width (from TU or PU) of the vertical boundary is referred as the side length of the Q side.

A boundary strength (Bs) value is calculated for each four-sample length boundary and can take 3 possible values as defined in Table 1. Luma and chroma components are processed separately in the de-blocking process. For the Luma component, only block boundaries with Bs values equal to 1 or 2 can be filtered. In the case of chroma components, only boundaries with Bs value equal to 2 can be filtered.

For luma component, additional conditions are checked for each four-sample length boundary to determine whether de-blocking filtering should be applied and to further determine whether a normal filter or a strong filter should be applied if de-blocking is applied.

For the luma component in the normal filtering mode, two samples at each side of the boundary can be modified. In the strong filtering mode, three samples at each side of the boundary can be modified.

For the chroma component, only one sample at each side of the boundary can be modified when the boundary strength is greater than 1.

TABLE 1

| Conditions | Bs |
| --- | --- |
| At least one of the blocks is Intra | 2 |
| At least one of the blocks has non-zero coded residual coefficient and boundary is a transform boundary | 1 |
| Absolute differences between corresponding spatial motion vector components of the two blocks are >=1 in units of inter pixels | 1 |
| Motion-compensated prediction for the two blocks refers to different reference pictures or the number of motion vectors is different for the two blocks | 1 |
| Otherwise | 0 |

Recently, some more flexible block structures are introduced in Joint Video Exploration Team (JVET). For example, the Quad-Tree plus Binary-Tree (QTBT) structure has been proposed in JVET-C00024 (H. Huang, et al., "*EE2.1: Quadtree plus binary tree structure integration with JEM tools*", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C00024). Asymmetric Tree (AT) block partition has been disclosed in D0064 (F. Le Leannec, et al., "*Asymmetric Coding Units in QTBT*", Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0064). Also, Multi-Type-Tree (MTT) structure has been disclosed in D0117 (X. Li, et al., "*Multi-Type-Tree*", Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET- D0117). In QTBT, recursive binary-tree CU partition can be applied at the leaf node of quad-tree. In MTT, additional triple-tree (TT) can be chosen for CU partition. FIG. 2 illustrates examples of different block partition types. In FIG. 2, quad-tree partitioning 210, vertical binary-tree partitioning 220, horizontal binary-tree partitioning 230, vertical centre-side triple-tree partitioning 240, horizontal centre-side triple-tree partitioning 250, vertical-left asymmetric tree partition 260, vertical-right asymmetric tree partition 270, horizontal-top asymmetric tree partition 280, and horizontal-bottom asymmetric tree partition 290 are shown.

Advanced Temporal Motion Vector Prediction (ATMVP)

In Joint Exploration Model (JEM) software with QTBT, each CU can have at most one set of motion for each prediction direction. The Advanced Temporal Motion Vector Prediction (ATMVP) mode is firstly proposed in VCEG-AZ10 (W.-J. Chien, et al., *"Extension of Advanced Temporal Motion Vector Predictor"*, ITU-T SG16/Q6 Document: VCEG-AZ10, June 2015). In ATMVP, a large CU is split into sub-CUs and motion information is derived for all the sub-CUs of the large CU. The ATMVP mode uses a spatial neighbour to get an initial vector, and the initial vector is used to determine the coordinate of the collocated block on the collocated picture. The sub-CU (usually 4×4 or 8×8) motion information of the collocated block in the collocated picture is then retrieved and filled into sub-CU (usually 4×4 or 8×8) motion buffer of current Merge candidate. The initial vector of the ATMVP mode may be modified in some embodiments. Some variant embodiments of the ATMVP are proposed. For example, a simplified ATMVP mode is disclosed in JVET-K0346 (X. Xiu, et al., *"CE4-related: One simplified design of advanced temporal motion vector prediction (ATMVP)"*, Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0346).

An example of ATMVP is shown in FIG. 3, where a CU is partitioned into sub-PUs. Unlike the traditional temporal candidate, the Sub-PU TMVP mode partitions the current PU into multiple Sub-PUs, and finds all corresponding temporal collocated motion vectors for each Sub-PU. The current PU of size M×N has (M/P)×(N/Q) sub-PUs, each sub-PU is of size P×Q, which M is divisible by P, and N is divisible by Q. The example in FIG. 3 corresponds to the case that a current PU 310 is divided into 16 sub-PUs (i.e., M/P=4 and N/Q=4). Sub-PU 0 (311) and sub-PU 1 (312) are indicated. The detailed algorithm for sub-PU TMVP is described as follows. The detail algorithm for Sub-PU TMVP is described as follows.

In step 1, for the current PU 310 coded in the sub-PU TMVP mode, an "initial motion vector", denoted as vec_init (323 and 324) is determined for the sub-PUs (321 and 322) of the collocated PU in a temporal collocated picture 320. For example, the vec_init can be the MV of the first available spatial neighbouring block of the current PU 310. In FIG. 3, vec_init_0 323 points to sub-block 325 and vec_init_1 323 points to sub-block 326. Alternatively, the MV of other neighbouring block may also be used as the initial motion vector. Conventionally, the vec_init is the first available candidate among spatial neighbouring blocks. For example, if the first available spatial neighbouring block has L0 and L1 MVs, and LX is the first list for searching collocated information, then the vec_init uses L0 MV when LX=L0, or L1 when LX=L1. The value of LX (L0 or L1) depends on which list (L0 or L1) is better for collocated information. If L0 is better for collocated information (e.g. POC (Picture Order Count) distance closer than L1), then LX is equal to L0, and vice versa. LX assignment can be performed at a slice level, brick level, tile group level, or picture level.

A "collocated picture searching process" then starts. The "collocated picture searching process" is to find a main collocated picture for all sub-PUs in the Sub-PU TMVP mode. The main collocated picture is denoted as main_colpic. Conventionally, it first searches the reference picture selected by the first available spatial neighbouring bloc. Then, in B-Slices, it searches all reference pictures of current picture starting from L0 (or L1), reference index 0, then index 1, then index 2, and so on (increasing index order). If it finishes searching L0 (or L1), then it searches another list. In P-slice, it first searches the reference picture selected by the first available spatial neighbouring block. Then, it searches all reference pictures of current picture of the list starting from reference index 0, then index 1, then index 2, and so on (increasing index order).

During searching, for each searched picture, a process named "availability checking" is performed. The "availability checking" process checks the collocated sub-PU around centre position of the current PU pointed by vec_init_scaled, where vec_init_scaled is the MV with appropriate MV scaling from the vec_init. Various ways can be used to determine the "around centre position". The "around centre position" may correspond to the centre pixel. For example, if the PU size is M*N, the centre is equal to position (M/2, N/2). The "around centre position" may also correspond to the centre sub-PU's centre pixel. The "around centre position" may be a mix of the above two methods depending on the current PU shape. In the "availability checking", if the checking result is an Inter mode, then the availability is true; otherwise (i.e., the checking result being an Intra mode), then the availability is false. After "availability checking", if the availability is true, then current searched picture is labelled as the main collocated picture and the searching process finishes. If the availability is true, the MV of the "around centre position" is used and scaled for the current block to derive the "default MV". If the availability is false, then it goes to search next reference picture.

During the "collocated picture searching process", MV scaling is needed when the reference picture of the vec_init is not equal to the original reference picture. The MV scaling process is that, a scaled version of the motion vector is used. The MV is scaled based on the temporal distances between the current picture and the reference picture of the vec_init and the searched reference picture, respectively. After MV scaling, the scaled MV is denoted as vec_init_scaled.

In step 2, for each sub-PU, it further finds the collocated location in main_colpic. Assuming the current Sub-PU is Sub-PU i, the collocated location is calculated as follows:

collocated location x=Sub-PU_i_x+vec_init_scaled_i_x (integer part)+shift_x, collocated location y=Sub-PU_i_y+vec_init_scaled_i_y (integer part)+shift_y.

In the above equations, Sub-PU_i_x means horizontal left-top location of sub-PU i inside the current picture (integer location); Sub-PU_i_y means vertical left-top location of sub-PU i inside the current picture (integer location); vec_init_scaled_i_x means the horizontal part of vec_init_scaled_i, which has integer part and fractional part and only the integer part is used in the calculation; and vec_init_scaled_i_y means the vertical part of vec_init_scaled_i, which has an integer part and fractional part and only the integer part is used in the calculation. The shift_x means a shift value in the x direction, which can be half of sub-PU width. The shift_y means a shift value in the y direction, which can be half of sub-PU height. Other values of shift_x and shift_y can be used as well.

Finally, in step 3, it finds the motion information of temporal predictor for each Sub-PU, denoted as SubPU_MI_i, of each Sub-PU. The SubPU_MI_i is the motion information (MI) from collocated_picture_i_L0 and collocated_picture_i_L1 at collocated location x and collocated location y. Here MI is defined as the set of {MV_x, MV_y, reference lists, reference index}. The MI may also include other Merge-mode-sensitive information, such as local illumination compensation flag. Moreover, in one example, MV_x and MV_y may be scaled according to the temporal distance relation between the collocated picture, current picture, and reference picture of the collocated MV. If MI is not available for some Sub-PU, the MI of Sub-PU around centre position will be used. In other words, the default MV is used. In FIG. 3, the motion vectors for sub-blocks 325 and 326 are labelled as 327 and 328 respectively.

Conventionally, there is only one Sub-PU TMVP candidate in the candidate list.

Affine Mode Motion Prediction

Motion occurs across pictures along temporal axis can be described by a number of different models. Assuming A(x, y) be the original pixel at location (x, y) under consideration, A'(x', y') be the corresponding pixel at location (x', y') in a reference picture for a current pixel A(x, y), the affine motion models are described as follows:

The affine model is capable of describing two-dimensional block rotations as well as two-dimensional deformations to transform a square (or rectangles) into a parallelogram. This model can be described as follows:

$x'=a_0+a_1*x+a_2*y$, and $$y'=b_0+b_1*x+b_2*y. \quad (1)$$

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \triangle \begin{cases} vx = (1-a)x - by - e \\ vy = (1-a)y + bx - f \end{cases} \quad (2)$$

An example of the four-parameter affine model is shown in FIG. 4A. The transformed block is a rectangular block. The motion vector field of each point in this moving block can be described by the following equation:

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases} \quad (3)$$

In the above equations, $(v_{0x}, v_{0y})$ is the control point motion vector (i.e., $v_0$) at the upper-left corner of the block, and $(v_{1x}, v_{1y})$ is another control point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used. An example of motion vectors for a current block can be determined for each 4×4 sub-block based on the MVs of the two control points as shown in FIG. 4B according to equation (3). After MCP, the high accuracy motion vector of each sub-block is rounded and saved as the same accuracy as the normal motion vector.

The conventional de-blocking filtering method is always applied to 8×8 luma blocks. In the new block partition structure, a CU or PU may be partitioned into block sizes smaller than 8×8. Furthermore, for sub-block coding tools such as SbTMVP or affine mode, the sub-CUs or sub-Pus within a CU or PU may be smaller than 8×8. According to the conventional de-blocking method, the computational load of de-blocking for the small size CU/PU or sub-CU/sub-PU increases substantially. Furthermore, the filtered samples at one boundary may be modified later by the de-blocking process at another boundary. It is desirable to develop new de-blocking methods to overcome these issues.

BRIEF SUMMARY OF THE INVENTION

A method and apparatus for de-blocking of reconstructed picture in for video encoding or video decoding are determined. According to this method, input data related to a current block in a current picture are received at a video encoder side or a video bitstream corresponding to compressed data including the current block in the current picture is received at a video decoder side. A block boundary of the current block and sub-block boundaries inside the current block are determined, where the current block is partitioned into a plurality of sub-blocks using sub-block mode prediction. A de-blocking process is applied to a reconstructed current block corresponding to the current block to result in a current filtered-reconstructed block, where said applying the de-blocking process to the current block comprises applying the de-blocking process to the sub-block boundaries inside the current filtered-reconstructed block. A filtered decoded picture including the current filtered-reconstructed block is generated.

In one embodiment, the sub-block mode prediction is one mode in a group comprising Advanced Temporal Motion Vector Prediction (ATMVP) mode, affine mode or Planar Motion Vector Prediction (MVP) mode.

In one embodiment, a target sub-block has a first boundary aligned with the block boundary of the current block and a second boundary inside the current block; a target width or height of the target sub-block is designated as K, at most M samples on the first boundary are allowed to be filtered by the de-blocking process and at most N samples on the second boundary are allowed to be filtered by the de-blocking process; (M+N) is constrained to be smaller than or equal to K. In the above, K, M and N are positive integers. The first boundary and the second boundary correspond to two vertical boundaries or two horizontal boundaries of the target sub-block. In one example, K is equal to 8, M is smaller than or equal to 3, and N is smaller than or equal to 3. In another example, K is equal to 8, M is smaller than or equal to 5, and N is smaller than or equal to 2.

In another embodiment, a target sub-block has a first boundary aligned with the block boundary of the current block and a second boundary inside the current block; a block size of the target sub-block corresponds to K×K; and a number of samples on the first boundary to be filtered by the de-blocking process is constrained to be K/2 or less. De-blocking process is applied to a reconstructed target sub-block corresponding to the target sub-block to result in a target filtered-reconstructed sub-block, wherein if one or more first reference samples used for the de-blocking process of the first boundary are to be modified by the de-blocking process of the second boundary, said one or more first reference samples are replaced by one or more padding samples that are not to be modified by the de-blocking process of the second boundary.

In another method, a first boundary and a second boundary associated with the current block is determined, and the first boundary and the second boundary correspond to two vertical boundaries or two horizontal boundaries of the current block. De-blocking process is applied to a reconstructed current block corresponding to the current block to result in a filtered-reconstructed current block. If one or more first reference samples used for the de-blocking process of the first boundary are to be modified by the de-blocking process of the second boundary, said one or more first reference samples are replaced by one or more padding samples that are not to be modified by the de-blocking process of the second boundary. A filtered decoded picture including the filtered-reconstructed current block is generated. The current block may correspond to a coding unit (CU) or the current block may correspond to one of a plurality of sub-CUs partitioned from the coding unit using sub-block mode prediction. The sub-block mode prediction can be one mode in a group comprising Advanced Temporal Motion Vector Prediction (ATMVP) mode, affine mode or Planar Motion Vector Prediction (MVP) mode.

In one embodiment, for each pixel line perpendicular to the first boundary and the second boundary, said one or more first reference samples to be modified by the de-blocking process of the second boundary are replaced by a target second reference pixel used for the de-blocking process of the second boundary, and wherein the target second reference pixel is closest to said one or more first reference samples in said each pixel line perpendicular to the first boundary.

In yet another method, de-blocking process is applied to a reconstructed current block corresponding to the current block to result in a current filtered-reconstructed block regardless whether a boundary of the current block corresponds to 8×8 sample grid boundaries. A filtered decoded picture including the current filtered-reconstructed block is generated.

In one embodiment, when a block size of the current block is equal to 4×4, at most two samples on each side of the boundary of the current block are used for the de-blocking process.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Method 1

De-blocking can be applied to all CU boundaries, regardless of whether the boundary corresponds to basic sample grid boundaries for de-blocking (for example, 8×8 sample grid boundaries). In one variation, when an Intra or Inter coding mode (e.g., ATMVP or Affine mode) splits a CU into multiple sub-CUs, de-blocking can be applied to all sub-CU boundaries regardless whether the boundary correspond to 8×8 sample grid boundaries. In another variation, when an Intra or Inter coding mode (e.g., ATMVP, Affine or Planar MVP mode) splits a CU into multiple sub-CUs, de-blocking can be applied to internal CU boundaries, which are align with sub-CU boundaries (or called which are at the same position as the sub-CU boundaries). Let N be the minimum size (either width or height) of the luma coding block, de-blocking is applied to boundary corresponding to the N×N luma sample grid boundaries. For example, N is equal to 4 for the QTBT structure.

Figure 1A:
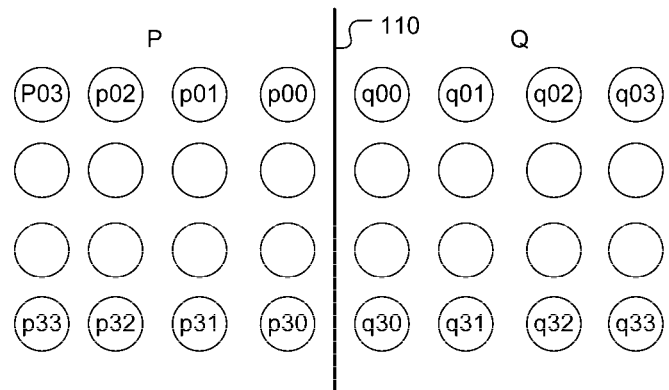
FIG. 1A illustrates an example of vertical boundary and involved samples of two blocks (P and Q) on two sides of the vertical boundary for de-blocking filtering.
Figure 1B:
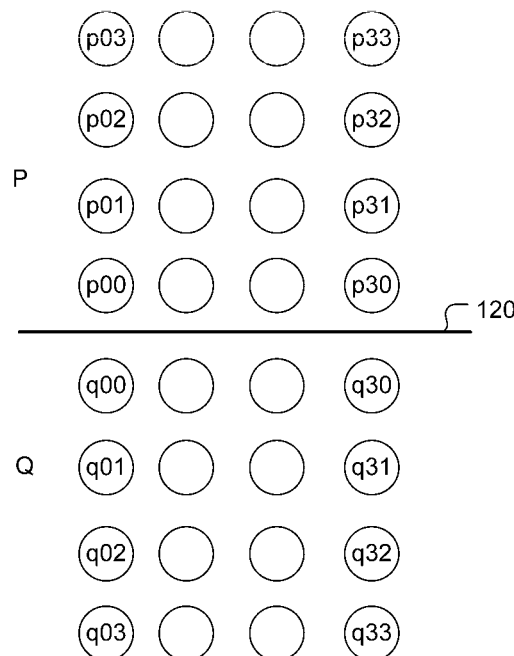
FIG. 1B illustrates an example of horizontal boundary and involved samples of two blocks (P and Q) on two sides of the horizontal boundary for de-blocking filtering.
Figure 2:
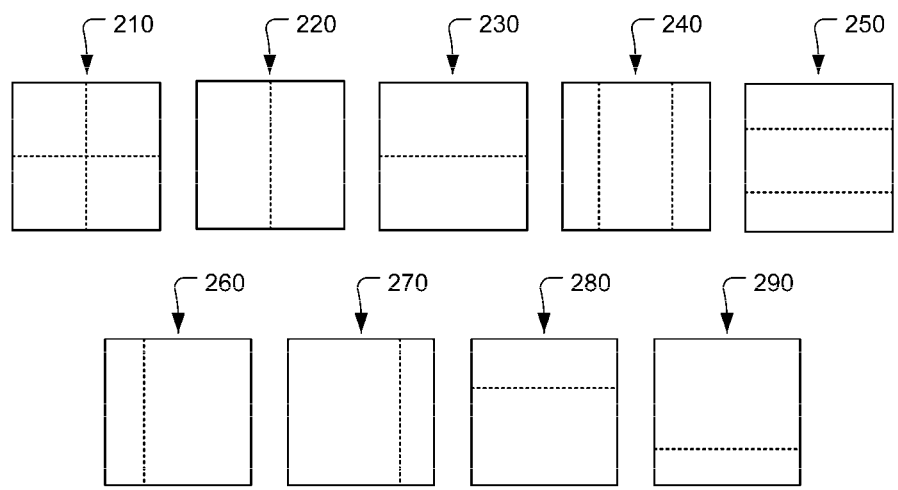
FIG. 2 illustrates examples of various block partition including (first row from left to right) quad-tree partitioning, vertical binary-tree partitioning, horizontal binary-tree partitioning, vertical centre-side triple-tree partitioning, horizontal centre-side triple-tree partitioning, and (second row from left to right) vertical-left asymmetric tree partition, vertical-right asymmetric tree partition, horizontal-top asymmetric tree partition, and horizontal-bottom asymmetric tree partition.
Figure 3:
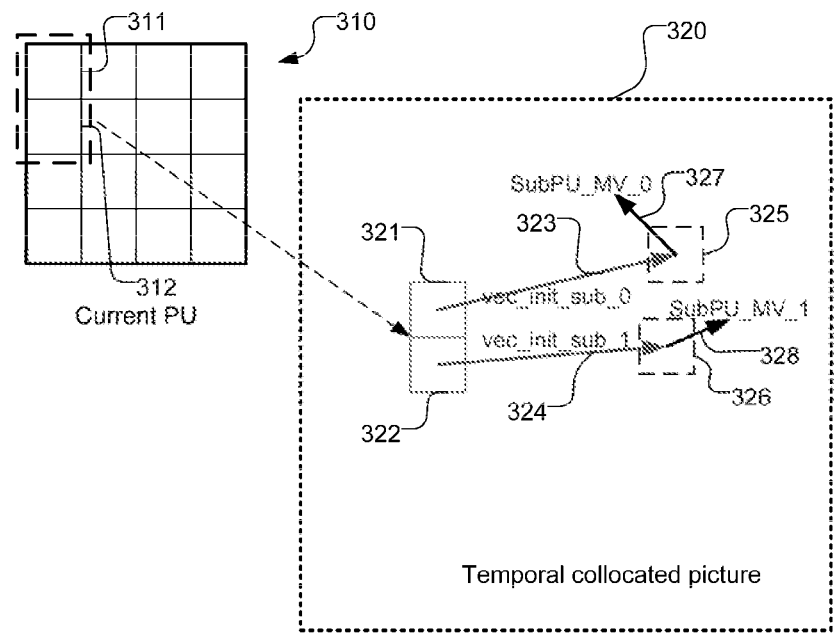
FIG. 3 illustrates an example of ATMVP, where a CU is partitioned into sub-PUs.
Figure 4A:
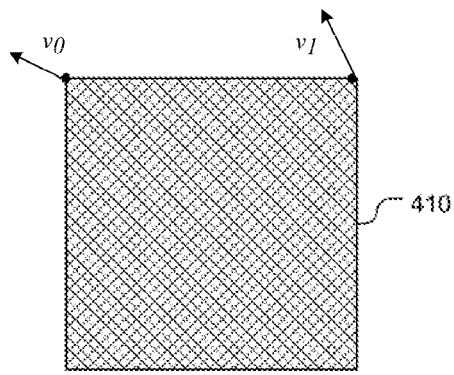
FIG. 4A illustrates an example of the four-parameter affine model, where the transformed block is a rectangular block.
Figure 4B:
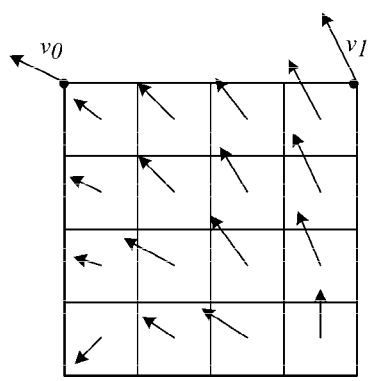
FIG. 4B illustrates an example of motion vectors for a current block, where the motion vector for each 4×4 sub-block is derived based on the MVs of the two control points.
Figure 5A:
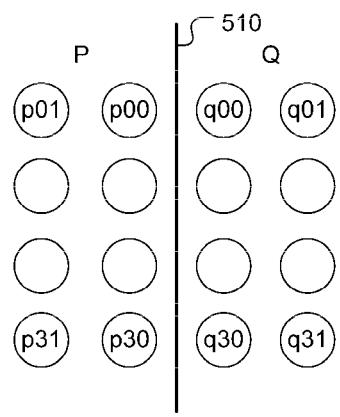
FIG. 5A illustrates an example of samples involved in de-blocking in the horizontal direction for N=4, where the vertical boundary is shown.
Figure 5B:
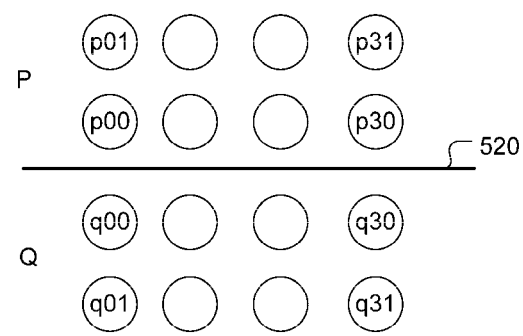
FIG. 5B illustrates an example of samples involved in de-blocking in the vertical direction for N=4, where the horizontal boundary is shown.

In one embodiment, the number of boundary samples involved in de-blocking each vertical boundary is N with N/2 samples at each side of the boundary. An example of involved samples for N=4 is illustrated in FIG. 5A, where the vertical boundary 510 is shown. The number of boundary samples involved in de-blocking each horizontal boundary is N with N/2 samples at each side of the boundary. An example of the involved samples for N=4 is illustrated in FIG. 5B, where the horizontal boundary 520 is shown.

In another embodiment, the samples filtered by the normal filtering mode are the closest N/4 samples at each side of the boundary and the samples filtered by the strong filtering mode are the closest N/2 samples at each side of the boundary. If N is equal to 4, the filtered samples by the normal filtering mode are pi0 and qi0 as shown in FIG. 5A and FIG. 5B, the samples filtered by strong filtering mode are pi0, pi1, qi0 and qi1 as shown in FIG. 5A and FIG. 5B, where i=0, . . . , 3.

In still another embodiment, the samples filtered by the normal filtering mode are the closest N/2 samples and the strong filtering mode is disabled. If N is equal to 4, the samples filtered by the normal filtering mode are pi0, pi1, qi0 and qi1 as shown in FIG. 5A and FIG. 5B. In other words, there is only one filtering mode instead of two.

In still another embodiment, the samples filtered by the normal filtering mode are the closest N/4 samples and the strong filtering mode is disabled. If N is equal to 4, the samples filtered by normal filtering mode are pi0 and qi0 as shown in FIG. 5A and FIG. 5B. In other words, there is only one filtering mode instead of two.

In still another embodiment, the strong filtering mode is conditionally disabled. If the width of the current CU is equal to N, the strong filtering mode is disabled for the vertical boundary. If the height of the current CU is equal to N, the strong filtering mode is disabled for the horizontal boundary.

In still yet another embodiment, the strong filtering mode is conditionally disabled. If the width of current sub-CU is equal to N, the strong filtering mode is disabled for the vertical boundary. If the height of current sub-CU is equal to N, the strong filtering mode is disabled for the horizontal boundary.

The normal and strong filters indicate the smoothness of filter. In one example of N equal to 4, the impulse response of normal filtering is (3 7 9 −3)/16, the impulse response of strong filtering is (1 2 2 1)/4.

In still another embodiment, when the CU or sub-CU width or height is N (e.g. N=4) and is smaller than the de-blocking grid (i.e., 8×8), the normal and strong filters are conditionally applied to one boundary and are skipped for the other boundary. In one example, the filters are applied to the first boundary (i.e., Boundary 1) in FIG. 6A and FIG. 6B. In another example, the filters are applied to the second boundary (i.e., Boundary 2) in FIG. FIG. 6A and FIG. 6B. All the operations for the normal and strong filters can be kept the same.

Method 2

When an Intra or Inter coding mode splits a CU into multiple sub-CUs (e.g., ATMVP or Affine mode), de-blocking can be applied to all sub-CU boundaries, regardless of whether the boundary corresponds to 8×8 sample grid boundaries.

Let the minimum size for de-blocking is M. The de-blocking process on a boundary depends on the current CU size. If the CU size (either width or height) is larger than or equal to M, the same de-blocking process as that in HEVC is applied.

Figure 6A:
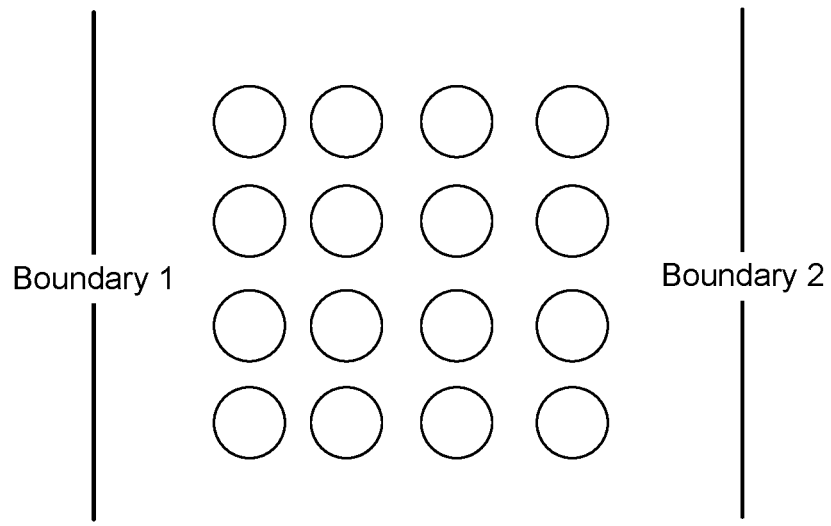
FIG. 6A illustrates an example of samples two vertical boundaries (boundary 1 and boundary 2) for a current block.
Figure 6B:
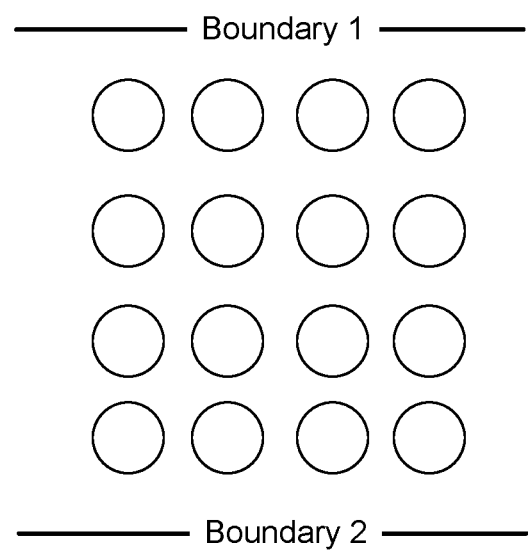
FIG. 6B illustrates an example of samples two horizontal boundaries (boundary 1 and boundary 2) for a current block.

In one embodiment, if the width of the current CU is equal to M, the number of boundary samples involved in de-blocking each vertical boundary is M with M/2 samples at each side of the boundary. An example for M=4 is shown in FIG. 6A, and an example of involved samples for M=4 is shown in FIG. 5A. If the height of the current CU is equal to M, the number of boundary samples involved in de-blocking each horizontal boundary is M with M/2 samples at each side of the boundary. An example of M=4 is shown in FIG. 6B, and an example of the involved samples for M=4 is shown in FIG. 5B.

In another embedment, if the width/height of the current CU is equal to M, then the samples filtered by normal filtering mode at the vertical/horizontal boundary are the closest M/4 samples at each side of the boundary and the samples filtered by strong filtering mode at vertical/horizontal boundary are the closest M/2 samples at each side of the boundary. If M is equal to 4, the filtered samples by the normal filtering mode are pi0 and qi0 as shown in FIG. 5A and FIG. 5B. The samples filtered by the strong filtering mode are pi0, pi1, qi0 and qi1 as shown in FIG. 5A and FIG. 5B.

In still another embodiment, if the width/height of the current CU is equal to M, the samples filtered by the normal filtering mode at the vertical/horizontal boundary are the closest M/2 samples and the strong filtering mode is disabled. If M is equal to 4, the samples filtered by the normal filtering mode at the vertical/horizontal boundary are pi0, pi1, qi0 and qi1 as shown in FIG. 5A and FIG. 5B.

In still another embodiment, if the width of the current CU is equal to M, de-blocking filter is disabled at the vertical boundary; and if the height of current CU is equal to M, de-blocking filter is disabled at the horizontal boundary.

In still another embodiment, when the CU width or height is N and is smaller than the de-blocking grid (i.e., M×M), the normal and strong filters are conditionally applied to one boundary and are skipped for the other boundary. In one example, the filters are applied to the first boundary (i.e., Boundary 1) in FIG. 6A and FIG. 6B. In another example, the filters are applied to the second boundary (i.e., Boundary 1) in FIG. 6A and FIG. 6B. All the operations for the normal and strong filter can be kept the same.

Methods 3

All the above mentioned methods can only use at most two samples of both sides for filtering decision and filtering operations. That means, only pi0, pi1, qi0 and qi1 are used in filtering decision and filtering operations. In one embodiment, the following equation is the condition for deciding whether the HEVC de-blocking filter is applied or not:

$$|p_{02}-2p_{01}+p_{00}|+|p_{32}-2p_{31}+p_{30}|+|q_{02}-2q_{01}+q_{0,0}|+|q_{32}-2q_{31}+q_{30}|<\beta.$$

If the lengths (or called side lengths) of two sides are both 4, the filtering decision is modified to the following equation according to one embodiment of the present invention:

$$|p_{01}-2p_{01}+p_{00}|+|p_{31}-2p_{31}+p_{30}|+|q_{01}-2q_{01}+q_{00}|+|q_{31}-2q_{31}+q_{30}|<\beta.$$

If only the length of p side is 4, the filtering decision is modified to:

$$|p_{01}-2p_{00}+p_{00}|+|p_{31}-2p_{31}+p_{30}|+|q_{02}-2q_{01}+q_{00}|+|q_{32}-2q_{31}+q_{30}|<\beta.$$

If only the length of q side is 4, then the filtering decision is modified to:

$$|p_{02}-2p_{01}+p_{00}|+|p_{32}-2p_{31}+p_{30}|+|q_{01}-2q_{01}+q_{00}|+|q_{31}-2q_{31}+q_{30}|<\beta.$$

In another embodiment, the following equations are the conditions for deciding between the weak/normal and strong de-blocking in HEVC:

$$|p_{i2}-2p_{i1}+p_{i0}|+|q_{i2}-2q_{i1}+q_{i0}|<\beta/8,$$

$$|p_{i3}-p_{i0}|+|q_{i3}-q_{i0}|<\beta/8, \text{ and}$$

$$|p_{i0}-q_{i0}|<2.5t_c.$$

Furthermore, if the lengths of two sides are both 4, then the decision criteria are modified to:

$$|p_{i1}-2p_{i1}+p_{i0}|+|q_{i1}-2q_{i1}+q_{i0}|<\beta/8,$$

$$|p_{i1}-p_{i0}|+|q_{i1}-q_{i0}|<\beta/8, \text{ and}$$

$$|p_{i0}-q_{i0}|<2.5t_c.$$

If only the length of q side is 4, then the decision criteria are modified to:

$$|p_{i1}-2p_{i1}+p_{i0}|+|q_{i2}-2q_{i1}+q_{i0}|<\beta/8,$$

$$|p_{i1}-p_{i0}|+|q_{i3}-q_{i0}|<\beta/8, \text{ and}$$

$$|p_{i0}-q_{i0}|<2.5t_c.$$

If only the length of q side is 4, the conditions for the filtering decision are modified to:

$$|p_{i2}-2p_{i1}+p_{i0}|+|q_{i1}-2q_{i1}+q_{i0}|<\beta/8,$$

$$|p_{i3}-p_{i0}|+|q_{i1}-q_{i0}|<\beta/8, \text{ and}$$

$$|p_{i0}-q_{i0}|<2.5t_c.$$

In still another embodiment, the following equations are the de-blocking decision in normal filtering mode in HEVC:

$$|p_{02}-2p_{01}+p_{00}|+|p_{32}-2p_{31}+p_{30}|<3/16\beta, \text{ and}$$

$$|q_{02}-2q_{01}+q_{00}|+|q_{32}-2q_{31}+q_{30}|<3/16\beta.$$

Furthermore if the lengths of two sides are both 4, the decision criteria are modified to:

$$|p_{01}-2p_{01}+p_{00}|+|p_{31}-2p_{31}+p_{30}|<3/16\beta, \text{ and}$$

$$|q_{01}-2q_{01}+q_{00}|+|q_{31}-2q_{31}+q_{30}|<3/16\beta.$$

If only the length of the p side is 4, the decision criteria are modified to:

$$|p_{01}-2p_{01}+p_{00}|+|p_{31}-2p_{31}+p_{30}|<3/16\beta, \text{ and}$$

$$|q_{02}-2q_{01}+q_{00}|+|q_{32}-2q_{31}+q_{30}|<3/16\beta, \text{ and}$$

If only the length of the q side is 4, the filtering decision is modified to:

$$|p_{02}-2p_{01}+p_{00}|+|p_{32}-2p_{31}+p_{30}|<3/16\beta,$$

$$|q_{01}-2p_{01}+q_{00}|+|q_{31}-2p_{31}+q_{30}|<3/16\beta, \text{ and}$$

$$|p_{i0}-q_{i0}|<2.5t_c.$$

In still another embodiment, the following equations are the normal filtering operations to derive the corresponding $\delta_{p1}$ and $\delta_{q1}$ for pi1, and qi1 in HEVC:

$$\delta_{p1}=(((p_2+p_0+1)\gg1)-p_1+\Delta_0)\gg1, \text{ and}$$

$$\delta_{p1}=(((q_2+q_0+1)\gg1)-q_1+\Delta_0)\gg1.$$

Furthermore, if the lengths of two sides are both 4, the normal filtering operations are modified to:

$$\delta_{p1}=(((p_1+p_0+1)\gg1)-p_1+\Delta_0)\gg1, \text{ and}$$

$$\delta_{q1}=(((q_1+q_0+1)\gg1)-q_1-\Delta_0)\gg1.$$

If only the length of the p side is 4, the normal filtering operations are modified to:

$$\delta_{p1}=(((p_1+p_0+1)\gg1)-p_1+\Delta_0)\gg1, \text{ and}$$

$$\delta_{q1}=(((q_2+q_0+1)\gg1)-q_2-\Delta_0)\gg1.$$

If only the length of the q side is 4, the normal filtering operations are modified to:

$$\delta_{p1}=(((p_2+p_0+1)\gg1)-p_2+\Delta_0)\gg1, \text{ and}$$

$$\delta_{p1}=(((q_1+q_0+1)\gg1)-q_1-\Delta_0)\gg1.$$

In still another embodiment, only one sample at the p side and only one sample at the q side are changed if any length of sides is 4.

Figure 7A:
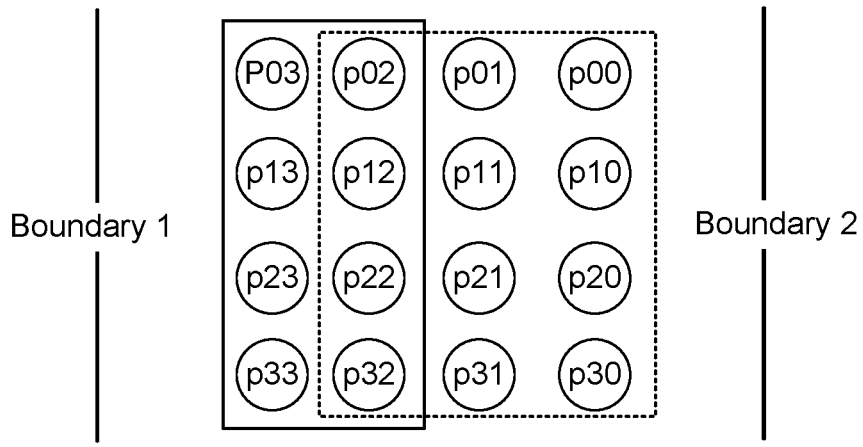
FIG. 7A-FIG. 7F illustrate various examples of samples used in doing de-blocking decision or operation of Boundary 2 indicated by the dash rectangle, and samples modified by the filtering operations at Boundary 1 indicated by the bold solid rectangle.
Figure 7B:
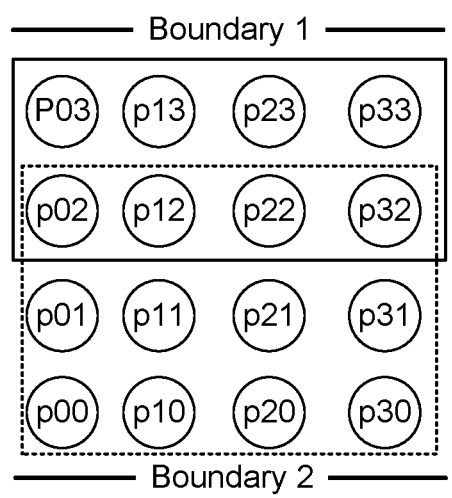
Figure 7C:
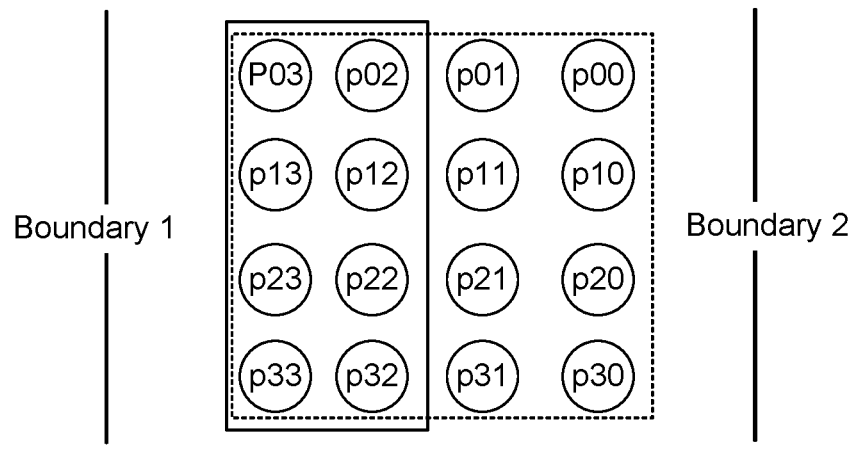
Figure 7D:
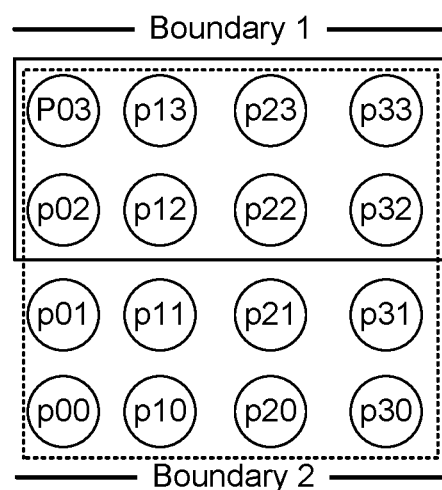
Figure 7E:
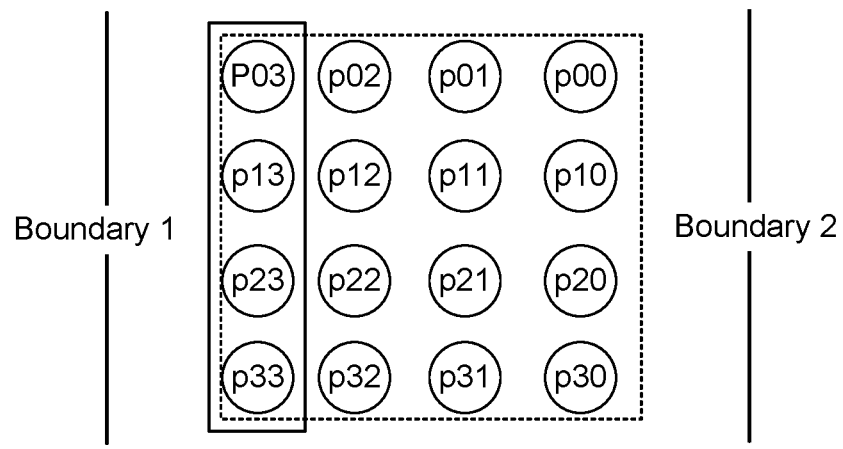
Figure 7F:
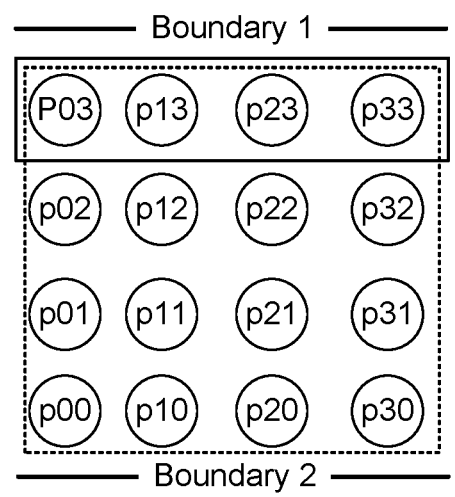

In another embodiment, it is assumed that the reference sample for deriving the de-blocking decision or filtering operations at a block boundary can be modified by the filtering operations at the other block boundary. The reference sample is replaced by the sample at the same de-blocking line that has the closest location to the sample that can be modified by the filtering operations at the other block boundary. For example, in FIGS. 7A-F, the samples inside the dash rectangle are used in doing de-blocking decision or operation of Boundary 2, and the samples in the bold solid rectangle might be modified by the filtering operations at Boundary 1 (i.e., the samples not in the bold solid rectangle might not be modified by the filtering operations at Boundary 1). For the cases in FIG. 7A and FIG. 7B, p02, p12, p22 and p32 are replaced by p01, p11, p21 and p31 in deriving de-blocking decision or filtering operation of Boundary 2, respectively. For the cases in FIG. 7C and FIG. 7D, p02 and p03 are replaced by p01; p12 and p13 are replaced by p11; p22 and p23 are replaced by p21; and p32 and p33 are replaced by p31 in deriving de-blocking decision or filtering operation of Boundary 2. For the cases in FIG. 7E and FIG. 7F, p03, p13, p23 and p33 are replaced by p02, p12, p22 and p32 in doing de-blocking decision or operation of Boundary 2, respectively.

Method 4

When an Intra or Inter coding mode splits a CU into multiple sub-CUs and the shape of each sub-CU are not all rectangle (e.g., triangle or trapezoid), the de-blocking can be applied to all sub-CU boundaries regardless of whether the boundary is at hypotenuse. Let the minimum size for de-blocking is M. For every line across the de-blocking boundary, if the size of the p side or q side is larger than or equal to M, the same de-blocking process as that in HEVC is applied to the p side or q side. Otherwise, as the aforementioned Method 3, the reference sample is replaced by the sample in the same line that is at the closest location to the sample that may be modified by the filtering operations at the other block boundary.

Method 5

Figure 8:
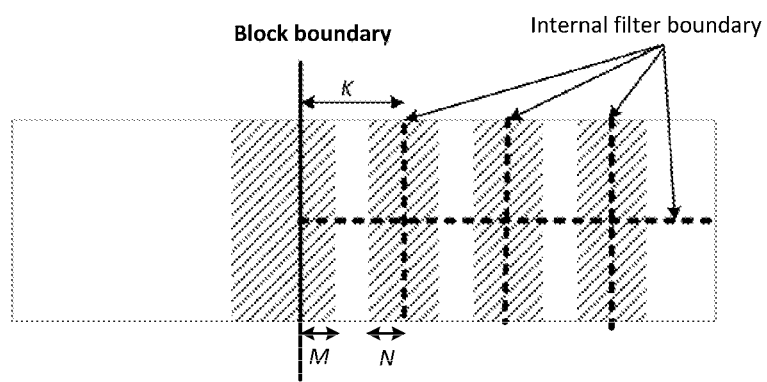
FIG. 8 illustrates an example of de-blocking constraints according to one embodiment of the present invention, where only maximum M samples are filtered at the side coded in sub-CU mode, only maximum N samples at both sides of internal sub-CU boundaries are filtered inside the block coded by the sub-CU mode, and K is the size from a block boundary to a first sub-CU boundary.

When an Intra or Inter coding mode splits a CU into multiple sub-CUs (e.g., ATMVP, Affine or Planar MVP mode), de-blocking can be applied to internal CU boundaries, which correspond to sub-CU boundaries (for example, being aligned with sub-CU boundaries or called being at the same position as the sub-CU boundaries). If at least one side of the current boundary is coded in sub-CU mode, only maximum M samples are filtered at the side coded in sub-CU mode. Besides, only maximum N samples at both sides of sub-CU boundaries are filtered inside the block coded by the sub-CU mode. Then, (M+N) must be smaller than or equal to K (i.e., (M+N)≤K), as illustrated in FIG. 8.

In one embodiment, K is equal to 8, M is smaller than or equal to 3. N is smaller than or equal to 3.

In another embodiment, K is equal to 8, M is smaller than or equal to 5. N is smaller than or equal to 2.

Method 6

When an Intra or Inter coding mode splits a CU into multiple sub-CUs (e.g., ATMVP, Affine or Planar MVP mode), de-blocking can be applied to internal CU boundaries, which correspond to sub-CU boundaries(for example, being aligned with sub-CU boundaries or called being at the same position as the sub-CU boundaries). If at least one side of the current boundary is coded in the sub-CU mode and the sub-CU size is K×K, then only maximum K/2 samples are filtered at the side coded in the sub-CU mode.

In another embodiment, K is equal to 8, only maximum 4 samples are filtered at the side coded in the sub-CU mode.

Any of the foregoing proposed methods can be implemented in encoders and/or decoders. For example, any of the proposed methods can be implemented in an Inter/Intra/prediction/transform module of an encoder, and/or an inverse transform/Inter/Intra/prediction module of a decoder. Alternatively, any of the proposed methods can be implemented as a circuit coupled to the inverse transform/Inter/Intra/prediction module of the encoder and/or the Inter/Intra/prediction/transform module of the decoder, so as to provide the information needed by the Inter/Intra/prediction/transform module.

Figure 9:
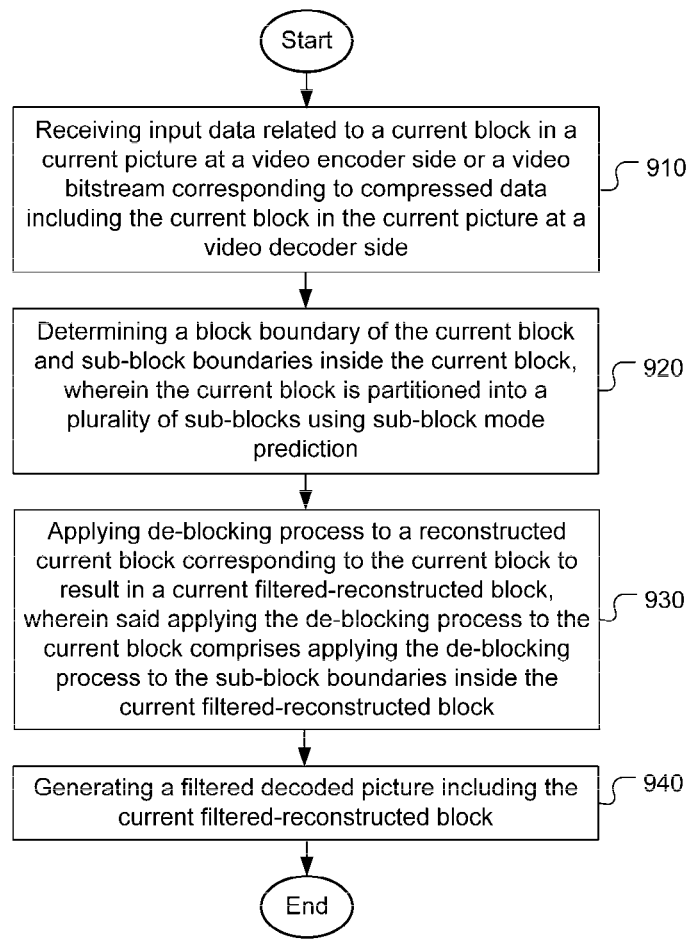
FIG. 9 illustrates a flowchart of an exemplary video coding using constrained de-blocking filter according to an embodiment of the present invention.

FIG. 9 illustrates a flowchart of an exemplary video coding using constrained de-blocking filter according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture are received at a video encoder side or a video bitstream corresponding to compressed data including the current block in the current picture are received at a video decoder side are received in step 910. A block boundary of the current block and sub-block boundaries inside the current block are determined in step 920, wherein the current block is partitioned into a plurality of sub-blocks using sub-block mode prediction. De-blocking process is applied to a reconstructed current block corresponding to the current block to result in a current filtered-reconstructed block in step 930, wherein said applying the de-blocking process to the current block comprises applying the de-blocking process to the sub-block boundaries inside the current filtered-reconstructed block. A filtered decoded picture including the current filtered-reconstructed block is generated in step 940.

Figure 10:
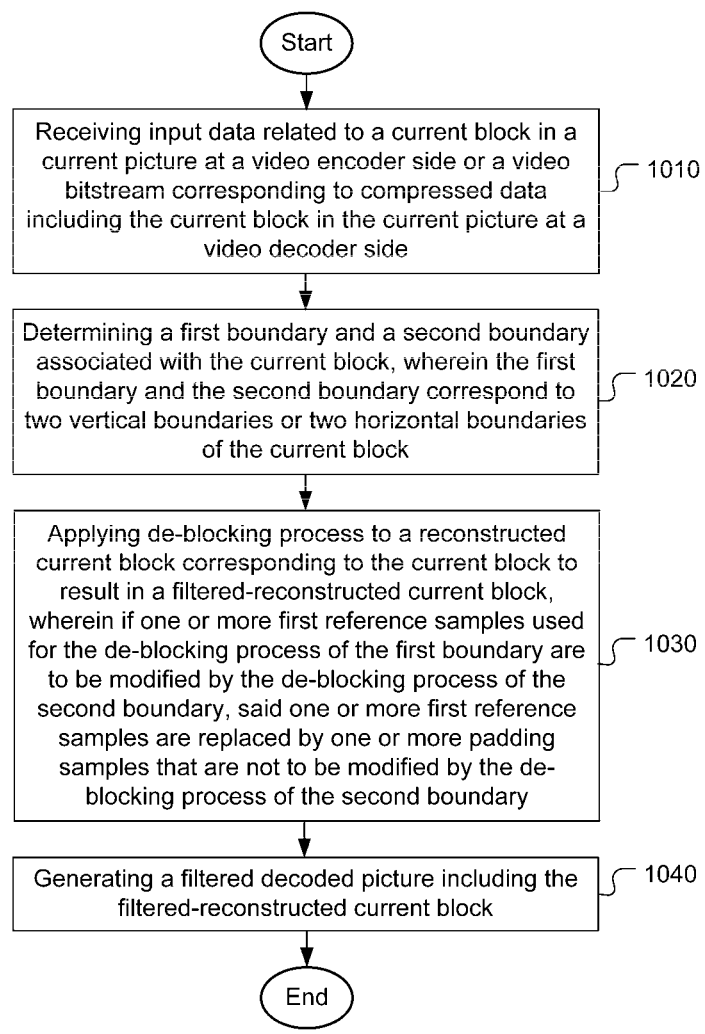
FIG. 10 illustrates a flowchart of another exemplary video coding using constrained de-blocking filter to reduce or remove interaction between the de-blocking processes on two boundaries of a block according to an embodiment of the present invention.

FIG. 10 illustrates a flowchart of another exemplary video coding using constrained de-blocking filter to reduce or remove interaction between the de-blocking processes on two boundaries of a block according to an embodiment of the present invention. According to this method, input data related to a current block in a current picture are received at a video encoder side or a video bitstream corresponding to compressed data including the current block in the current picture are received at a video decoder side are received in step 1010. A first boundary and a second boundary associated with the current block are determined in step 1020, wherein the first boundary and the second boundary correspond to two vertical boundaries or two horizontal boundaries of the current block. De-blocking process is applied to a reconstructed current block corresponding to the current block to result in a filtered-reconstructed current block in step 1030, wherein if one or more first reference samples used for the de-blocking process of the first boundary are to be modified by the de-blocking process of the second boundary, said one or more first reference samples are replaced by one or more padding samples that are not to be modified by the de-blocking process of the second boundary. A filtered decoded picture including the current filtered-reconstructed block is generated in step 1040.

Figure 11:
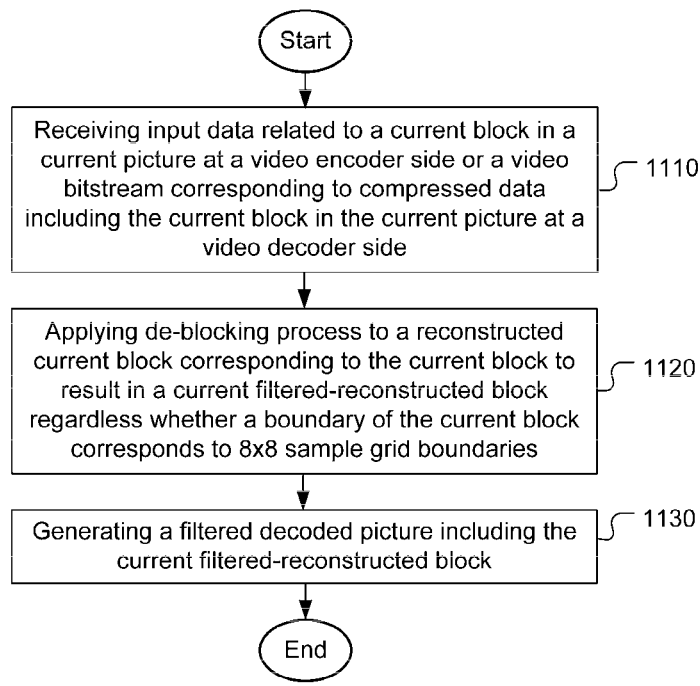
FIG. 11 illustrates a flowchart of yet another exemplary video coding using de-blocking filter by applying the de-blocking process to a block boundary regardless whether it corresponds to 8×8 sample grid boundaries according to an embodiment of the present invention.

FIG. 11 illustrates a flowchart of yet another exemplary video coding using de-blocking filter by applying the de-blocking process to a block boundary regardless whether the block boundary corresponds to 8×8 sample grid boundaries according to an embodiment of the present invention. According to this method, input data related to a current block in a current picture are received at a video encoder side or a video bitstream corresponding to compressed data including the current block in the current picture are received at a video decoder side are received in step 1110. De-blocking process is applied to a reconstructed current block corresponding to the current block to result in a current filtered-reconstructed block regardless whether a boundary of the current block correspond to 8×8 sample grid boundaries in step 1120. A filtered decoded picture including the current filtered-reconstructed block is generated in step 1130.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of de-blocking of reconstructed picture in for video encoding or video decoding, the method comprising:
receiving input data related to a current block in a current picture at a video encoder side or a video bitstream corresponding to compressed data including the current block in the current picture at a video decoder side;
determining a block boundary of the current block and sub-block boundaries inside the current block, wherein the current block is partitioned into a plurality of sub-blocks using sub-block mode prediction;
applying de-blocking process to a reconstructed current block corresponding to the current block to result in a current filtered-reconstructed block, wherein said applying the de-blocking process to the current block comprises applying the de-blocking process to the sub-block boundaries inside the current filtered-reconstructed block; and
generating a filtered decoded picture including the current filtered-reconstructed block,
wherein a target sub-block has a first boundary corresponding to the block boundary of the current block and a second boundary inside the current block; a target width or height of the target sub-block is designated as K, at most M samples on the first boundary are allowed to be filtered by the de-blocking process and at most N samples on the second boundary are allowed to be filtered by the de-blocking process; (M+N) is constrained to be smaller than or equal to K; and wherein K, M and N are positive integers, and the first boundary and the second boundary correspond to two vertical boundaries or two horizontal boundaries of the target sub-block.

2. The method of claim 1, wherein the sub-block mode prediction is one mode in a group comprising Advanced Temporal Motion Vector Prediction (ATMVP) mode, affine mode or Planar Motion Vector Prediction (MVP) mode.

3. The method of claim 1, wherein K is equal to 8, M is smaller than or equal to 3, and N is smaller than or equal to 3.

4. The method of claim 1, wherein K is equal to 8, M is smaller than or equal to 5, and N is smaller than or equal to 2.

5. The method of claim 1, wherein a target sub-block has a first boundary corresponding to the block boundary of the current block and a second boundary inside the current block; a block size of the target sub-block corresponds to K×K; and at most K/2 samples on the first boundary are filtered by the de-blocking process.

6. An apparatus of Inter prediction for video coding, the apparatus comprising one or more electronic circuits or processors arranged to:
receive input data related to a current block in a current picture at a video encoder side or a video bitstream corresponding to compressed data including the current block in the current picture at a video decoder side;
determine a block boundary of the current block and sub-block boundaries inside the current block, wherein the current block is partitioned into a plurality of sub-blocks using sub-block mode prediction;
apply de-blocking process to a reconstructed current block corresponding to the current block to result in a current filtered-reconstructed block, wherein the de-blocking process applied to the current block comprises applying the de-blocking process to the sub-block boundaries inside the current filtered-reconstructed block; and
generate a filtered decoded picture including the current filtered-reconstructed block,
wherein a target sub-block has a first boundary corresponding to the block boundary of the current block and a second boundary inside the current block; a target width or height of the target sub-block is designated as K, at most M samples on the first boundary are allowed to be filtered by the de-blocking process and at most N samples on the second boundary are allowed to be filtered by the de-blocking process; (M+N) is constrained to be smaller than or equal to K; and wherein K, M and N are positive integers, and the first boundary and the second boundary correspond to two vertical boundaries or two horizontal boundaries of the target sub-block.

* * * * *